(12) United States Patent
Hughes et al.

(10) Patent No.: US 9,164,967 B2
(45) Date of Patent: Oct. 20, 2015

(54) EXTRACTING FONT METADATA FROM FONT FILES INTO SEARCHABLE METADATA FOR PACKAGE DISTRIBUTION

(75) Inventors: Richard Hughes, London (GB); Behdad Esfahbod, Toronto (CA); André Nicolas Mailhot, Paris (FR)

(73) Assignee: Red Hat, Inc., Raleigh, NC (US)

( * ) Notice: Subject to any disclaimer, the term of this patent is extended or adjusted under 35 U.S.C. 154(b) by 1218 days.

(21) Appl. No.: 12/626,179

(22) Filed: Nov. 25, 2009

(65) Prior Publication Data
US 2011/0126191 A1 May 26, 2011

(51) Int. Cl.
G06F 17/30 (2006.01)
G06F 17/21 (2006.01)
G06F 9/445 (2006.01)
G06F 9/44 (2006.01)

(52) U.S. Cl.
CPC ............ *G06F 17/214* (2013.01); *G06F 8/61* (2013.01); *G06F 17/21* (2013.01); *G06F 17/30259* (2013.01); *G06F 9/4446* (2013.01)

(58) Field of Classification Search
None
See application file for complete search history.

(56) References Cited

U.S. PATENT DOCUMENTS

| | | | |
|---|---|---|---|
| 6,853,980 B1* | 2/2005 | Ying et al. | 705/26.62 |
| 7,539,939 B1* | 5/2009 | Schomer | 715/269 |
| 2002/0002468 A1* | 1/2002 | Spagna et al. | 705/1 |
| 2003/0084096 A1* | 5/2003 | Starbuck et al. | 709/203 |
| 2003/0131321 A1* | 7/2003 | Teshima | 715/542 |
| 2005/0270553 A1* | 12/2005 | Kawara | 358/1.13 |
| 2005/0275656 A1* | 12/2005 | Corbin et al. | 345/467 |
| 2006/0174319 A1* | 8/2006 | Kraemer et al. | 726/1 |
| 2007/0006076 A1* | 1/2007 | Cheng | 715/542 |
| 2007/0055934 A1* | 3/2007 | Adamson, III | 715/542 |
| 2007/0083522 A1* | 4/2007 | Nord et al. | 707/10 |
| 2009/0102846 A1* | 4/2009 | Flockermann et al. | 345/440 |
| 2009/0225086 A1* | 9/2009 | Tomida | 345/472 |
| 2010/0107062 A1* | 4/2010 | Bacus et al. | 715/269 |

OTHER PUBLICATIONS

"Fedora 11 Installation Guide: Installing Fedora 11 on x86, AMD64, and Intel® 64 architectures," Ed. 1.0, Fedora Documentation Project, fedora-docs-list@redhat.com, Red Hat, Inc. and others, 2009, 274 pages.
"Fedora 11 User Guide: Using Fedora 11 for common desktop computing tasks," Ed. 1.0, Fedora Documentation Project, fedora-docs-list@redhat.com, Red Hat, Inc. and others, 2009, 118 pages.
"File Association Web Service and Internet Communication," Microsoft Corporation, Microsoft TechNet, 2009, downloaded from http://technet.microsoft.com/en-us/library/cc784930(WS.10,printer).aspx, 7 pages.
"Skip the Annoying 'Use the Web service to find the correct program' Dialog," HowToGeek.com, Mar. 30, 2008, downloaded from http://www.howtogeek.com/howto/windows-vista/skip-the-annoying-use-the-web-service-to-find-the-correct-program-dialog/, 3 pages.

\* cited by examiner (Continued)

*Primary Examiner* — Bai D. Vu
(74) *Attorney, Agent, or Firm* — Lowenstein Sandler LLP

(57) ABSTRACT

A package installer identifies a font package that facilitates rendering a font of a file being opened by a user based on font metadata downloaded from the remote server. The font metadata includes information identifying one or more font packages available for download from the remote server. Font metadata associated with each font package further indicates one or more fonts supported by the corresponding font package. A graphical user interface (GUI) is displayed to the user prompting whether the user desires to install the identified font package. The GUI further indicates that an additional font needs to be installed in order to view the file correctly. In response to an input from the user via the GUI, the package installer downloads the font package from the remote server for local installation.

17 Claims, 6 Drawing Sheets

```
/ HEADER: 201
| requires: "font-filesystem"
| provides: ":lang=pt"
| provides: ":lang=en_GB"      203
| builddate: "2007"

| BODY: 202
| /usr/share/fonts/icelandic-bold.ttf
| /usr/share/fonts/icelandic-italic.ttf
| /usr/share/fonts/icelandic-normal.ttf
```

```
/ BODY: 250
| icelandic-fonts.rpm
| - requires: "font-filesystem"
| - provides: ":lang=pt"
| - provides: ":lang=en_GB"       251
| ...
| british-fonts.rpm
| - requires: "font-filesystem"
| - provides: ":lang=en_GB"       252
```

FIG. 2B

EXTRACTING FONT METADATA FROM FONT FILES INTO SEARCHABLE METADATA FOR PACKAGE DISTRIBUTION

TECHNICAL FIELD

Embodiments of the invention relate generally to the field of software application distribution; and more particularly, to extracting font metadata from font files into searchable metadata for package distribution.

BACKGROUND

People often send other users documents and images. These files are often of different formats or fonts, as a user could send a Microsoft Word file (.doc file) or a GNU image manipulation program (GIMP) image (.xcf) via email, instant messaging or even on physical media.

Applications can view many different fonts and font scripts in the same document. For example, a document can be created that has right-to-left formatted Arabic script in one section and left-to-right Latin script in another. Due to the nature of how fonts are created and packaged, not all fonts contain all glyphs. In addition, often font designers only do the minimum of characters, such as a-z, A-Z and 1-9. Accented characters such as 'â' may not be included in the font set, and it is even less likely that characters such as ''ऐ' ' will be included. Only a few fonts are installed by default on most operating system (OS) distributions as the fonts are relatively large in size.

Typically in an application, the missing glyphs are shown as black squares with hexadecimal numbers so that a user is aware that some characters are not displayable or recognizable. One solution is for the user to download and install additional fonts that have the required glyphs, usually a specialist font for that language. However, the user has to know what font to download, and it may take the user a few attempts in order to get the right one. As a result, the user has to stop what he/she is doing, and manually search for and install the proper font packages.

BRIEF DESCRIPTION OF THE DRAWINGS

The present invention is illustrated by way of example and not limitation in the figures of the accompanying drawings in which like references indicate similar elements.

FIGS. 2A and 2B are block diagrams illustrating a package file according to one embodiment of the invention.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

When a font package is packaged, each font includes one or more font files (e.g., true type fonts or open type fonts). By parsing the font files for glyph matches, each supported language can be added as a virtual provide to the built font package. This virtual provide is added to the distribution font metadata which allows a remote program to query what font package supports a given mime type by querying the font metadata. For example, in LINUX operating environment, this can be done using a WhatProvides( )method, typically using the PackageKit. An example query would be WhatProvides(":lang=en_GB") which would return a list of all the not-yet-installed font packages that would be used to view this language text. By writing a script to extract the mime data at font package build time, many virtual provides can be added just by rebuilding all the font packages in a repository. A virtual provide is a little piece of data about the package that resides in the distribution metadata, and thus the package does not have to be installed to query this data.

By integrating this application programmable interface (API) into a default font renderer handler (in the case of LINUX, GNOME, a fontconfig GTK module launched when the gnome-packagekit tools are started at session start time), an experience can be provided where when a user opens a document, an application such as a word processor (e.g., Abiword) tries to view the file and a helper provides a list of fonts the user can install to view the file correctly. After the font packages are installed, the application shows the correct text for the document. In this way a user can send documents to remote users knowing that they will be able to view the contents correctly.

Figure 1:
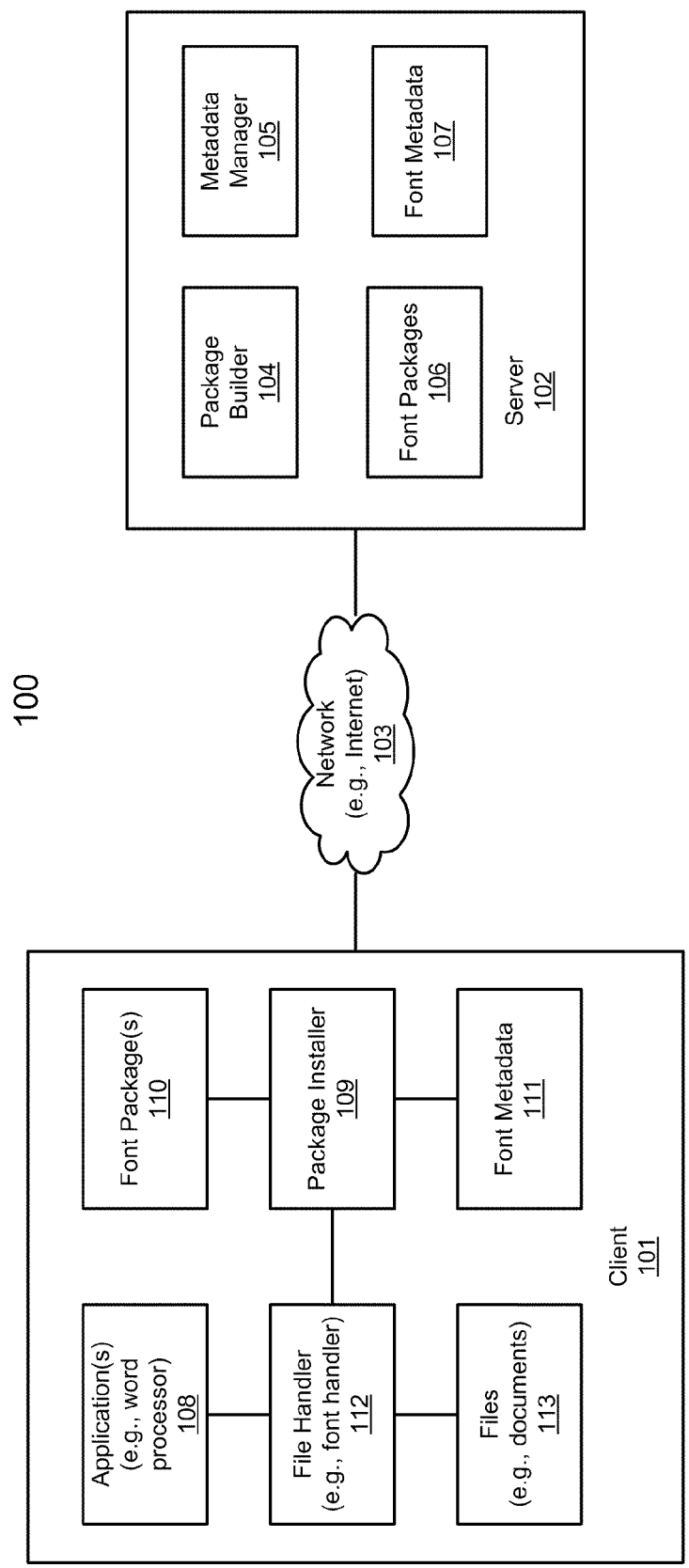
FIG. 1 is a block diagram illustrating a network configuration according to one embodiment of the invention.

FIG. 1 is a block diagram illustrating a network configuration according to one embodiment of the invention. Referring to FIG. 1, network configuration 100 includes a client 101 communicatively coupled to a server 102 over a network. Client 101 can be any kind of computing devices such as desktop, laptop, personal digital assistant (PDA), or cellular phone, etc. Server 102 may include one or more computing devices such as a Web server for distributing software packages, such as font packages, that can be downloaded by client 101 over network 103. Network 103 may be local area network (LAN) or a wide area network (WAN) such as the Internet. Note that although one client and one server are shown in FIG. 1, multiple clients and/or servers may also be implemented.

In one embodiment, server 102 includes, among others, a package builder 104 and metadata manager 105. Package builder 104 is configured to build (e.g., compile and/or link) and manage font packages 106 that can be downloaded by client 101 for installation at client 101. A font package is a single file having compressed therein one or more font files. Once a font package is built, according to one embodiment, the metadata manager 105 is configured to scan each font file contained in the font package to extract certain font metadata from each font file and insert the font metadata into the font package. Alternatively, a font provider may provide, together with a font file, a font description file describing the corresponding font file. In this situation, in addition to scanning the actual font file, the metadata manager may also scan the font description file to extract the corresponding font metadata. For example, when a font author made a mistake and created a font file that says "I am FontX, Bold" when it is really "FontXY, Bold", it is much simpler for a package builder to put a file to be associated with the font file that tells an application that "this font is really FontXY, Bold" rather than trying to modify the actual font file. This also can reduce the possible situations in which some of the glyphs in a font file are bad and the metadata scanner is unable to recognize that certain resources present in the font file are not usable by simply scanning the actual font file. However, such information may be provided by a font description file, which would allow a user to override the information in a font file with the information extracted from the font description file. The added font metadata includes information indicating a particular font or fonts that are supported by the associated font package.

The added font metadata is typically inserted into a header of the font package, such as, for example, the font package file 200 as shown in FIG. 2A. Referring to FIG. 2A, font package file 200 includes a file header 201 and body 202. File header 201 includes font metadata 203 indicating that the font package file supports fonts associated with certain languages. File body 202 includes all the individual font files contained in the package 200. As a result, when a file hander (e.g., file handler 112) attempts to open a file having an unrecognized font, the file handler can invoke a package installer (e.g., package installer 109) to query the font package to determine whether a particular font is supported by the font package.

Referring back to FIG. 1, the package 200 can then be stored in a storage device associated with server 102 as a part of packages 106. In addition, metadata manager 105 is configured to scan each of the font packages 106, to extract all the font metadata from the font packages 106 (e.g., ":lang=pt" or ":lang=en_GB"), and to save all the font metadata to a font metadata file as a part of font metadata file 107 in a storage device. A font metadata file 107 may be an extensible markup language (XML) compatible data file. This font metadata file 107 is relatively small compared to the size of the font packages 106 as it does not contain all the content data; it just contains all the text font metadata. The font metadata file 107 is compressed and saved in a storage device.

Note that the package builder 104 and the font packages 106 do not have to be on the same server as the font metadata 107. For example, the font packages 106 can be built at another server or facility, including the font metadata. The font packages 106 can then be stored at a server accessible from a user network (e.g., Internet). The font metadata from individual font packages can then be extracted (e.g., at the same server or another server). A pointer is added in the extracted metadata referenced to a location of those font packagers 106. The resultant extracted metadata can then be published on a server accessible over a network. Thus, server 106 could just be a distribution server that hosts the font metadata 107, while another server or servers are used to host the actual font packages. Also, it is useful to index font packages on a master distribution server, and then to copy the font packages and the extracted metadata indexes to another distribution server or servers. Other configurations may also be implemented.

FIG. 2B is a block diagram illustrating an example of a font metadata file. For example, font metadata file 250 may be implemented as part of font metadata file 107. Referring to FIG. 2B, font metadata 250 includes metadata extracted from one or more font packages. For example, metadata 251 includes information identifying a first font package (e.g., "icelandic-fonts.rpm") supporting certain languages (e.g., ":lang=pt" and ":lang=en_GB"), while metadata 252 includes information identifying a second font package (e.g., "british-fonts.rpm") supporting certain languages (e.g., ":lang=en_GB"), etc. Note that in this example, the filename may indicate a type of languages (e.g., British); however, some other font filenames may not indicate anything at all, dependent upon specific implementations. For example, a font can be used for multiple languages, which could be identified by scanning the corresponding metadata.

Referring back to FIG. 1, client 101 includes one or more applications 108 (e.g., word processor) communicatively coupled to a file handler 112, which provides an application programming interface (API) to access one or more files 113 (e.g., word document files). When application 108 attempts to open a file via file handler 112, if file handler 112 cannot recognize a certain font of the file that is being opened, the file handler 112 invokes a package installer 109 to download one or more font packages and/or the associated font metadata from server 102 over network 103. The resulting font packages 110 include one or more font files that can be installed at client 101 in order to view certain fonts of files 113 correctly.

According to one embodiment, when application 108 attempts to open a file having a font that is not recognizable, package installer 109 is invoked, for example, to "find me all font packages that provide:lang=pt". The package installer 109 can download the newest font metadata file 107 very quickly from server 102 because the font metadata is relatively small in size. The package installer 109 then knows about every font package (e.g., font packages 106) available for installation from server 102. Package installer 109 can scan the font metadata looking for matches, and return a list to the user of the font packages that match the search (e.g., available for installation for opening the file with unrecognized font).

Figure 3:
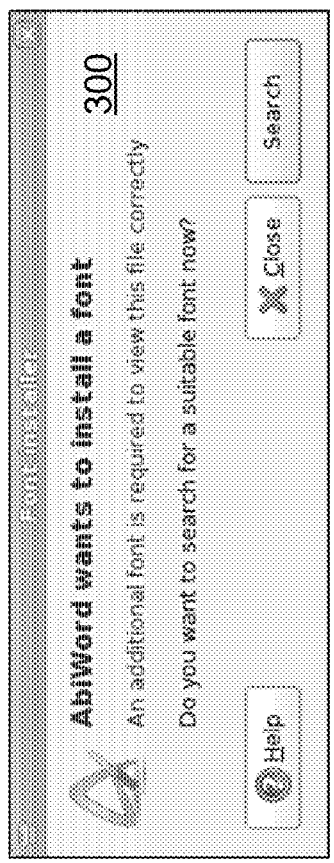
FIG. 3 is screenshot illustrating an example of graphical user interface (GUI) which may be used with one embodiment of the invention.

In one embodiment, when a user attempts to open a document with an unknown font, the font installer (as a part of package installer 109) displays a GUI 300 of FIG. 3 indicating that an additional font needs to be installed. GUI 300 may also display a message identifying a specific font that is required to view a particular document.

In response to the GUI displayed, referring back to FIG. 1, if the user actually wants to install identified font, the package installer 109 has to match an identifier of the font to a remote filename using the previously downloaded font metadata (e.g., font metadata 111), and then download the font package itself (e.g., font packages 106). The user can then install the local font file at client 101. In this way, the package installer 109 can automatically locate the latest or a specific version of required font files from server 102 and install them at client 101. As a result, a user of client 101 does not need to know which font is needed for opening a particular file and does not need to manually conduct a search for the required font or fonts over the network.

The font metadata 111 stored at the local system can be periodically updated by downloading the newest font metadata 107 from server 102 onto the local client 101, and then searching through the font metadata to determine if any of the remote font packages are newer than the ones that have been installed locally. In this way the font metadata 111 is kept up to date. Since the font packages and font metadata are distributed by a centralized server or servers 102, the client 101 can be sure that the font packages downloaded and installed are the latest versions.

Figure 4:
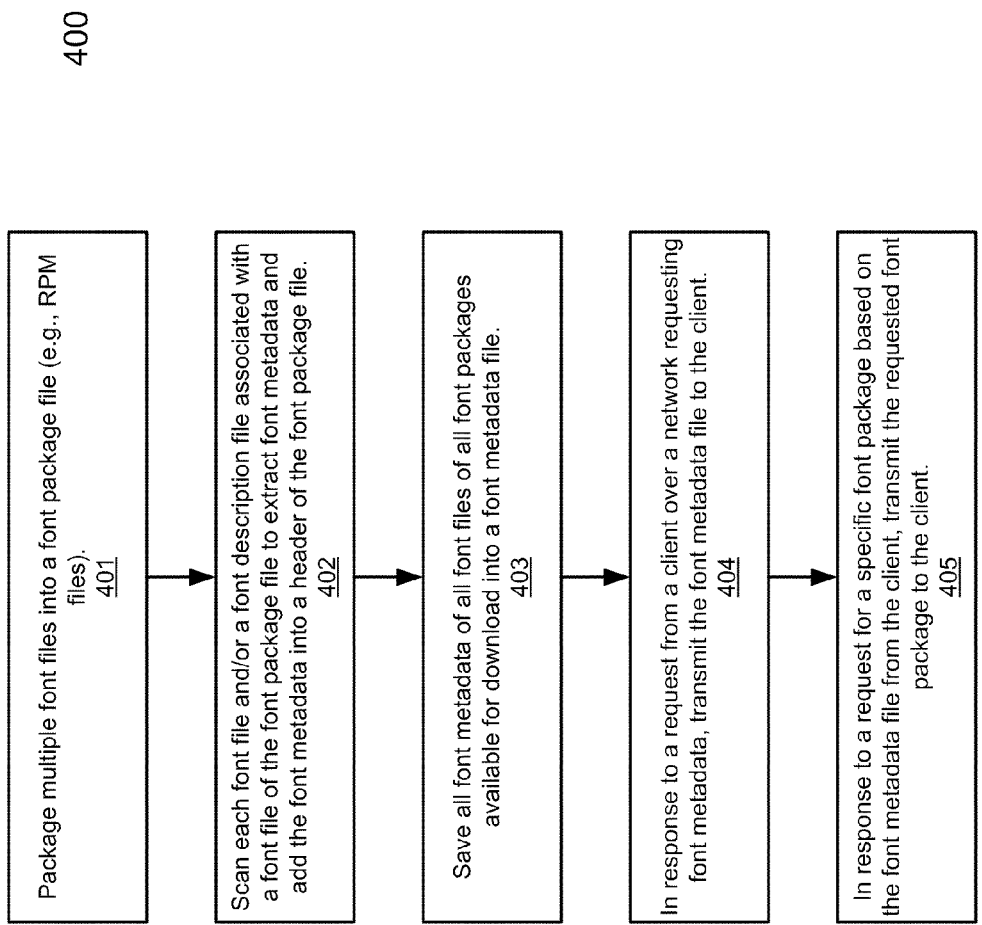
FIG. 4 is a flow diagram illustrating a method for building packages and metadata for download and installation according to one embodiment.

FIG. 4 is a flow diagram illustrating a method for building font packages and font metadata for download and installation according to one embodiment. Note that method 400 may be performed by processing logic which may include software, firmware, hardware, or a combination thereof. For example, method 400 may be performed by package builder 104 and/or metadata manager 105 of FIG. 1. Referring to FIG. 4, at block 401, multiple files (e.g., font files) are packaged into a font package file, such as, for example, a Red Hat package manager (RPM) file distributed by Red Hat, Inc. of Raleigh, N.C. The font package can be built locally at the distribution server or remotely at another server. At block 402, each font file or the associated font description file in the font package is scanned and certain font metadata is extracted and added into the font package, where the font metadata identifies a specific font or fonts supported by the font package or available for download. At block 403, all font metadata extracted from the package is stored in a font metadata file. Subsequently, in response to a request from a client over a network requesting font metadata, at block 404, the font metadata is transmitted to the client. In response to receiving a further request for installing a specific font package based on the font metadata file from the client, at block 405, the requested font package is transmitted to the client for opening a specific file that has an unrecognized font by the client.

Figure 5:
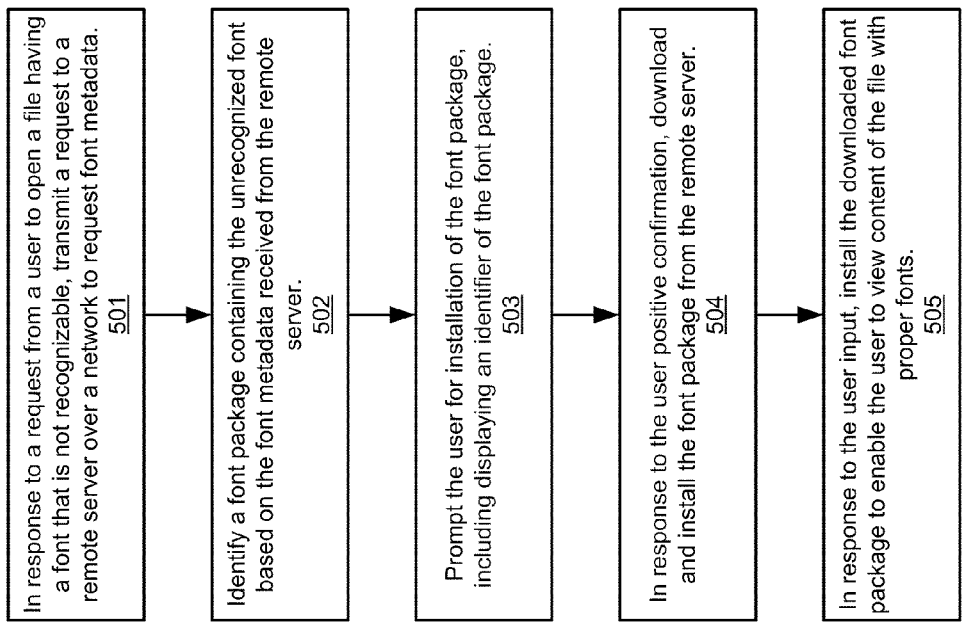
FIG. 5 is a flow diagram illustrating a method for installing packages according to one embodiment.

FIG. 5 is a flow diagram illustrating a method for installing font packages according to one embodiment. Note that method 500 may be performed by processing logic which may include software, firmware, hardware, or a combination thereof. For example, method 500 may be performed by package installer 109 of FIG. 1. Referring to FIG. 5, in response to a request from a user to open a file having an unrecognizable font, at block 501, a request is transmitted to a remote server over a network requesting font metadata. Note that if there is an existing font metadata stored locally, the local font metadata may be examined first before sending a request for an updated font metadata. As described above, the font metadata may be periodically updated from the remote server. At block 502, a font package is identified that is capable of rendering the unrecognized font based on the font metadata received from the remote server or alternatively, based on a local copy of the font metadata. The font package may be identified by matching font metadata extracted from the file being opened and the font metadata stored in the font metadata file. At block 503, a GUI is displayed to the user requesting whether the user desires to download and install the required font package. In response to an input received from the user via the GUI, at block 504, the identified font package is downloaded from the server and installed at the client locally at block 505.

Figure 6:
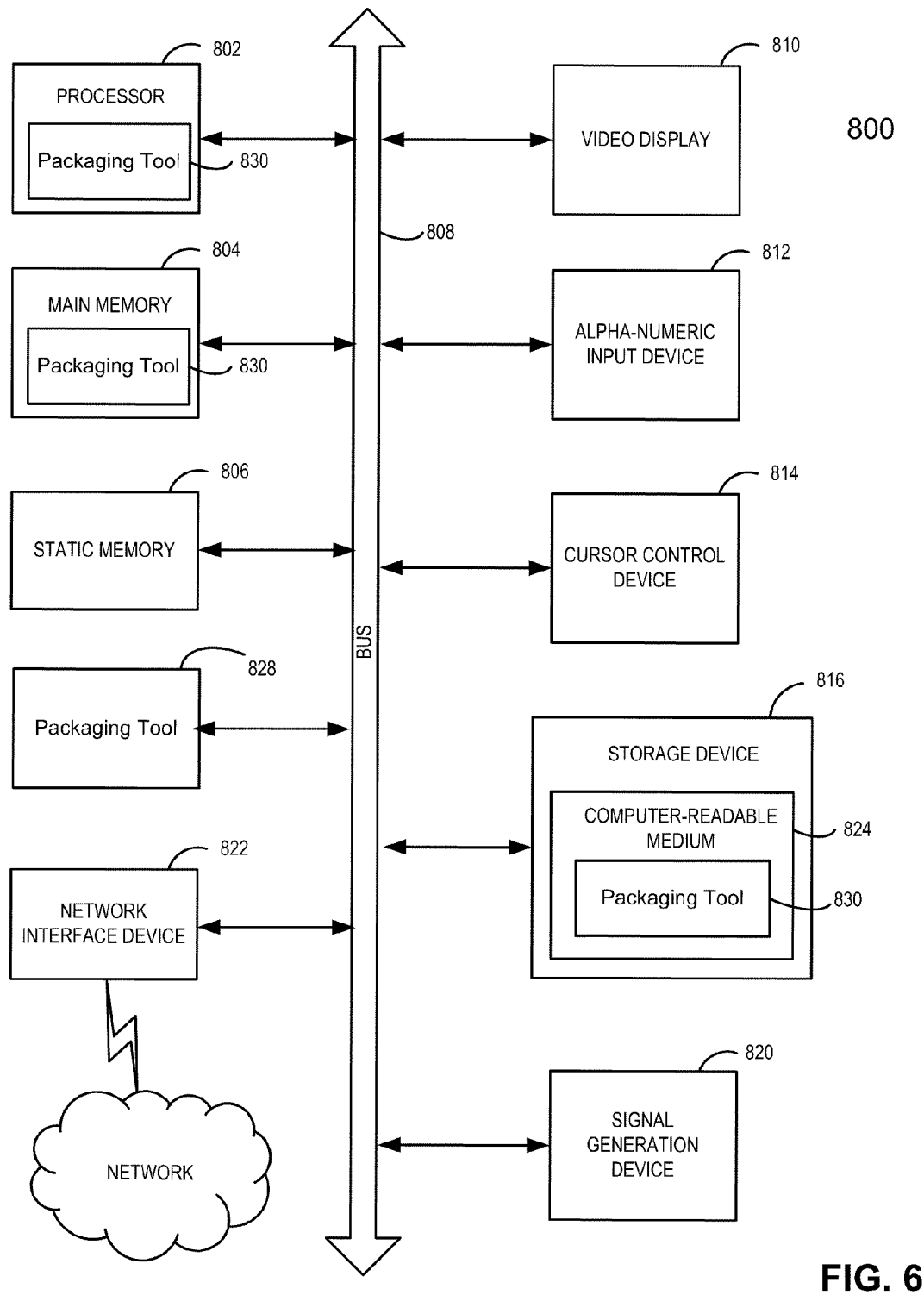
FIG. 6 illustrates a diagrammatic representation of a machine in the exemplary form of a computer system according to one embodiment.

FIG. 6 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 830 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., packaging tool 830, which may be implemented as part of package installer 109, package builder 104, and/or metadata manager 105) embodying any one or more of the methodologies or functions described herein. The packaging tool 830 may also reside, completely or at least partially, within the main memory 804 and/or within the processor 802 during execution thereof by the computer system 800, the main memory 804 and the processor 802 also constituting machine-accessible storage media. The packaging tool 830 may further be transmitted or received over a network via the network interface device 822.

The computer-readable storage medium 824 may also be used to store the packaging tool 830 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices.

In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "displaying" or "downloading" or "installing" or "invoking" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
   determining that a font of a file being opened by a user was not recognized;
   downloading, from a remote server, font metadata comprising information extracted from a font package and used to identify the font package available for download from the remote server, wherein the font package comprises glyph content data to facilitate rendering the font and the font metadata comprises textual metadata without the glyph content data;
   identifying, by a package installer executed by a processor of a client device, the font package in view of the font metadata and in response to determining that the font of the file was not recognized;
   displaying, at the client device, a graphical user interface (GUI) to indicate an additional font needs to be installed; and
   downloading, by the package installer in response to an input from the user via the GUI, the font package from the remote server for local installation.

2. The method of claim 1, further comprising:
   installing locally, by the package installer, the font package downloaded from the remote server.

3. The method of claim 2, wherein prior to downloading the identified font package, a distribution package comprising the font package is created within the remote server, wherein font metadata is extracted from the font package and inserted into the distribution package, the font metadata comprising information identifying a font supported by the font package.

4. The method of claim 3, wherein the font metadata is inserted into a header of the font package while a body of the font package comprises multiple font files, each font file corresponding to a particular font.

5. The method of claim 4, wherein a copy of the font metadata of the font package is stored in a font metadata file that comprises font metadata of other font packages available for download from the remote server.

6. The method of claim 1, further comprising periodically downloading the font metadata from the remote server to retrieve the latest font metadata available from the remote server.

7. A non-transitory computer readable storage medium comprising instructions that, when executed by a processor, cause the processor to:
   determine that a font of a file being opened by a user was not recognized;
   download, from a remote server, font metadata comprising information extracted from a font package and used to identify the font package available for download from the remote server, wherein the font package comprises glyph content data to facilitate rendering the font and the font metadata comprises textual metadata without the glyph content data;
   identify, by a package installer executed by the processor of a client device, the font package in view of the font metadata and in response to determining that the font of the file was not recognized;

display, at the client device, a graphical user interface (GUI) to indicate an additional font needs to be installed; and download, by the package installer in response to an input from the user via the GUI, the font package from the remote server for local installation.

8. The non-transitory computer readable storage medium of claim 7, wherein the processor further to:

install locally, by the package installer, the font package downloaded from the remote server.

9. The non-transitory computer readable storage medium of claim 8, wherein prior to downloading the identified font package, a distribution package comprising the font package is created within the remote server, wherein font metadata is extracted from the font package and inserted into the distribution package, the font metadata comprising information identifying a font supported by the font package.

10. The non-transitory computer readable storage medium of claim 9, wherein the font metadata is inserted into a header of the font package while a body of the font package comprises multiple font files, each font file corresponding to a particular font.

11. The non-transitory computer readable storage medium of claim 10, wherein a copy of the font metadata of the font package is stored in a font metadata file that comprises font metadata of other font packages available for download from the remote server.

12. The non-transitory computer readable storage medium of claim 7, wherein the processor further to periodically download the font metadata from the remote server to retrieve the latest font metadata available from the remote server.

13. A system, comprising:

a file handler to open a file in response to a user request, determine that a font of the file was not recognized, and identify the unrecognized font of the file;

font metadata downloaded from a remote server, the font metadata comprising information extracted from a font package and used to identify the font package available for download from the remote server, wherein the font package comprises glyph content data to facilitate rendering the font of the file and the font metadata comprises textual metadata without the glyph content data;

a package installer on a client device coupled to the file handler to identify the font package in view of the font metadata and in response to determining that the font of the file was not recognized; and a display device, of the client device, coupled to the file handler and the package installer to display a graphical user interface (GUI) to the user prompting whether the user desires to install the identified font package, the GUI further indicating that an additional font needs to be installed in order to view the file correctly, wherein in response to an input from the user via the GUI, the package installer downloads the font package from the remote server for local installation.

14. The system of claim 13, wherein the file handler invokes the package installer to locally install the font package downloaded from the remote server.

15. A method comprising:

scanning, by a package builder executed by a processor, each font file contained in a font package file comprising a plurality of font files packaged therein to extract font metadata associated with each font file, wherein the font package file comprises glyph content data and the font metadata comprises textual metadata without the glyph content data;

inserting, by the package builder, the extracted font metadata into the font package file, the font metadata comprising information identifying a font supported by each of the plurality of font files contained within the font package file;

storing, by a metadata manager, the extracted font metadata in a font metadata file, wherein the font metadata file further comprises font metadata associated with other font package files available for download;

transmitting, by the metadata manager, the font metadata file to a client over a network in response to a first request for font metadata from the client; and transmitting, by the package builder, a particular font package file to the client in response to a second request for the particular font package file from the client in view of the font metadata, wherein the font package file is to be installed at the client in response to a determining that a font of a file being opened by a user was not recognized, and wherein the transmitted font package file facilitates rendering the unrecognized font.

16. The method of claim 15, wherein the font metadata is inserted into a header of the font package file while a body of the package file comprises multiple actual font files.

17. The method of claim 15, wherein the font metadata file is periodically updated in view of the font package files available for download.

* * * * *